(12) United States Patent
Price et al.

(10) Patent No.: US 10,628,950 B2
(45) Date of Patent: Apr. 21, 2020

(54) MULTI-SPECTRUM ILLUMINATION-AND-SENSOR MODULE FOR HEAD TRACKING, GESTURE RECOGNITION AND SPATIAL MAPPING

(71) Applicant: Microsoft Technology Licensing, LLC, Redmond, WA (US)

(72) Inventors: Raymond Kirk Price, Redmond, WA (US); Michael Bleyer, Seattle, WA (US); Denis Demandolx, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 121 days.

(21) Appl. No.: 15/447,064

(22) Filed: Mar. 1, 2017

(65) Prior Publication Data
US 2018/0253856 A1 Sep. 6, 2018

(51) Int. Cl.
*G06T 7/521* (2017.01)
*G02B 27/01* (2006.01)
(Continued)

(52) U.S. Cl.
CPC .............. *G06T 7/521* (2017.01); *G01B 11/25* (2013.01); *G01S 5/16* (2013.01); *G01S 7/4808* (2013.01); *G01S 7/4813* (2013.01); *G01S 7/4815* (2013.01); *G01S 17/023* (2013.01); *G01S 17/08* (2013.01); *G01S 17/46* (2013.01); *G01S 17/89* (2013.01); *G02B 5/208* (2013.01);
(Continued)

(58) Field of Classification Search
CPC . G06T 19/066; G06T 7/521; G06T 7/50–596; G06F 3/011; G06F 3/012; G06F 3/017; H04N 13/332–344; H04N 13/366–383; G01B 11/25
See application file for complete search history.

(56) References Cited

U.S. PATENT DOCUMENTS

| 6,115,482 A * | 9/2000 | Sears ...................... G06F 3/011 348/62 |
| 7,566,855 B2 | 7/2009 | Olsen et al. |

(Continued)

FOREIGN PATENT DOCUMENTS

| EP | 2503357 A1 | 9/2012 |
| WO | 2005034035 A1 | 4/2005 |

(Continued)

OTHER PUBLICATIONS

"Active and Passive Modes in One IR Camera", http://www.photonics.com/Article.aspx?AID=52832, Published on: Jan. 21, 2013, 4 pages.
(Continued)

*Primary Examiner* — Robert J Hance
(74) *Attorney, Agent, or Firm* — Arent Fox LLP (57) ABSTRACT

A device and method use multiple light emitters with a single, multi-spectrum imaging sensor to perform multi-modal infrared light based depth sensing and visible light based Simultaneous Localization and Mapping (SLAM). The multi-modal infrared based depth sensing may include, for example, any combination of infrared-based spatial mapping, infrared based hand tracking and/or infrared based semantic labeling. The visible light based SLAM may include head tracking, for example.

28 Claims, 9 Drawing Sheets

(51) Int. Cl.

| | | |
|---|---|---|
| *G02B 27/00* | (2006.01) | |
| *G06T 7/579* | (2017.01) | |
| *G02B 5/20* | (2006.01) | |
| *H04N 5/33* | (2006.01) | |
| *G01B 11/25* | (2006.01) | |
| *G01S 7/481* | (2006.01) | |
| *G01S 17/02* | (2020.01) | |
| *G01S 5/16* | (2006.01) | |
| *G01S 17/89* | (2020.01) | |
| *G01S 7/48* | (2006.01) | |
| *G01S 17/46* | (2006.01) | |
| *G01S 17/08* | (2006.01) | |
| *H04N 13/366* | (2018.01) | |
| *H04N 13/383* | (2018.01) | |
| *G06F 3/01* | (2006.01) | |

(52) U.S. Cl.
CPC ..... *G02B 27/0093* (2013.01); *G02B 27/0172* (2013.01); *G06F 3/012* (2013.01); *G06F 3/017* (2013.01); *G06T 7/579* (2017.01); *H04N 5/332* (2013.01); *H04N 13/366* (2018.05); *H04N 13/383* (2018.05); *G02B 2027/014* (2013.01); *G02B 2027/0138* (2013.01); *G06T 2207/10028* (2013.01); *G06T 2207/10048* (2013.01)

(56) References Cited

U.S. PATENT DOCUMENTS

| | | | |
|---|---|---|---|
| 8,446,470 B2 | 5/2013 | Lu et al. | |
| 9,083,960 B2 | 7/2015 | Wagner et al. | |
| 9,122,053 B2 | 9/2015 | Geisner et al. | |
| 9,285,893 B2* | 3/2016 | Holz | G06K 9/00375 |
| 2012/0236288 A1* | 9/2012 | Stanley | G01B 11/2513 |
| | | | 356/4.01 |
| 2012/0327116 A1* | 12/2012 | Liu | G09G 5/377 |
| | | | 345/633 |
| 2013/0007668 A1* | 1/2013 | Liu | G06F 3/012 |
| | | | 715/841 |
| 2013/0127980 A1* | 5/2013 | Haddick | G06F 3/013 |
| | | | 348/14.08 |
| 2014/0125813 A1* | 5/2014 | Holz | G06K 9/00375 |
| | | | 348/169 |
| 2014/0169392 A1 | 6/2014 | Kim | |
| 2014/0267031 A1* | 9/2014 | Huebner | G06F 3/0346 |
| | | | 345/158 |
| 2014/0306874 A1 | 10/2014 | Finocchio et al. | |
| 2015/0002734 A1* | 1/2015 | Lee | H04N 5/2256 |
| | | | 348/367 |
| 2015/0063681 A1 | 3/2015 | Bhardwaj et al. | |
| 2015/0130908 A1 | 5/2015 | Kang et al. | |
| 2015/0258432 A1* | 9/2015 | Stafford | A63F 13/213 |
| | | | 463/32 |
| 2015/0302659 A1 | 10/2015 | O'connor et al. | |
| 2015/0304638 A1 | 10/2015 | Cho et al. | |
| 2016/0210783 A1* | 7/2016 | Tomlin | G06T 19/006 |
| 2016/0252748 A1 | 9/2016 | Jiang | |
| 2017/0053042 A1* | 2/2017 | Sugden | G02B 27/0179 |
| 2017/0206691 A1* | 7/2017 | Harrises | G02B 27/0172 |

FOREIGN PATENT DOCUMENTS

| | | |
|---|---|---|
| WO | 2016076796 A1 | 5/2016 |
| WO | 2017030742 A1 | 2/2017 |

OTHER PUBLICATIONS

Yang, et al., "Fusion of Active and Passive Sensors for Fast 3D Capture", In Proceedings of IEEE International Workshop on Multimedia Signal Processing, Oct. 4, 2010, 6 pages.

Foxlin, et al., "WearTrack: A Self-Referenced Head and Hand Tracker for Wearable Computers and Portable VR", In Proceedings of International Symposium on Wearable Computers, Oct. 16, 2000, 8 pages.

Surur, "Daqri is a Hololens competitor that may beat Microsoft to the Enterprise punch", http://mspoweruser.com/daqri-hololens-competitor-may-beat-microsoft-enterprise-punch/, Published on: Apr. 18, 2016, 10 pages.

"International Search Report and Written Opinion Issued in PCT Application No. PCT/US18/019305", dated Aug. 2, 2018, 23 Pages.

* cited by examiner

| V | IR | V | IR | V | IR | V | IR | V | IR | V | IR |
|---|----|---|----|---|----|---|----|---|----|---|----|
| IR | V | IR | V | IR | V | IR | V | IR | V | IR | V |
| V | IR | V | IR | V | IR | V | IR | V | IR | V | IR |
| IR | V | IR | V | IR | V | IR | V | IR | V | IR | V |
| V | IR | V | IR | V | IR | V | IR | V | IR | V | IR |
| IR | V | IR | V | IR | V | IR | V | IR | V | IR | V |
| V | IR | V | IR | V | IR | V | IR | V | IR | V | IR |
| IR | V | IR | V | IR | V | IR | V | IR | V | IR | V |
| V | IR | V | IR | V | IR | V | IR | V | IR | V | IR |
| IR | V | IR | V | IR | V | IR | V | IR | V | IR | V |
| V | IR | V | IR | V | IR | V | IR | V | IR | V | IR |
| IR | V | IR | V | IR | V | IR | V | IR | V | IR | V |

MULTI-SPECTRUM ILLUMINATION-AND-SENSOR MODULE FOR HEAD TRACKING, GESTURE RECOGNITION AND SPATIAL MAPPING

BACKGROUND

Depth sensing technology can be used to determine a person's location in relation to nearby objects or to generate an image of a person's immediate environment in three dimensions (3D). One application in which depth (distance) sensing technology may be used is in head-mounted display (HMD) devices and other types of near-eye display (NED) devices. Depth sensing technology can employ a time-of-flight (ToF) depth camera or structured light depth camera. With ToF based depth sensing technology, a light source emits light into its nearby environment, and a ToF camera captures the light after it reflects off nearby objects. The time taken for the light to travel from the light source and to reflect back from an object to the ToF camera can be converted, based on the known speed of light, into a depth measurement (i.e., the distance to the object). Alternatively, the phase of the detected return signal can be determined and used to calculate the depth measurement. Such a measurement can be processed with other similar measurements to create a map of physical surfaces in a particular environment (called a depth image or depth map) and, if desired, to render a 3D image of the environment. Structured light depth cameras project a light pattern onto the environment. The 3D geometry of the environment causes the light to appear distorted when observed from a different perspective. The difference in perspective is caused by the physical spacing (also called the "baseline") between the illuminator and the camera imager.

SUMMARY

Introduced here are a device and method (collectively and individually, "the technique introduced here") that use multiple light emitters with a single, multi-spectrum imaging sensor to perform multi-modal infrared light based depth sensing and visible light based Simultaneous Localization and Mapping (SLAM). The multi-modal infrared based depth sensing may include, for example, any combination of infrared based hand tracking, infrared-based spatial mapping and/or infrared based semantic labeling. The visible light based SLAM may include head tracking, for example.

In some embodiments, a near-eye display device in accordance with the technique introduced here includes an illumination module, an imaging sensor and a processor. The illumination module emits first light of a first frequency range (e.g., infrared) toward an environment of the near-eye display device. The imaging sensor receives the first light of the first frequency range reflected by the environment and second light of a second frequency range (e.g., ambient visible light) reflected by the environment. The processor recognizes a gesture made by a body part of a user of the near-eye display device based on the received first light and tracks a position and/or orientation of the head of the user based on the received second light.

In some embodiments, a near-eye display device in accordance with the technique introduced here includes a first illumination module, a second illumination module, an imaging sensor and a processor. The first illumination module emits structured light of a first frequency range (e.g., infrared) toward an environment in which the near-eye display device is located. The environment includes an object other than a user of the near-eye display device. The second illumination module emits second light of the first frequency range (e.g., infrared) toward the environment in which the near-eye display device is located. The imaging sensor receives at least a portion of the structured light reflected by the object, at least a portion of the second light reflected by a body part of the user of the near-eye display device, and third light of a second frequency range (e.g., ambient visible light) reflected by at least a portion of the environment. The processor generates a spatial map of the environment based on the received portion of the structured light, detects a gesture made by the body part of the user based on the received portion of the second light, and tracks a position and/or orientation of the head of the user based on the received third light.

Other aspects of the disclosed embodiments will be apparent from the accompanying figures and detailed description.

This Summary is provided to introduce a selection of concepts in a simplified form that are further explained below in the Detailed Description. This Summary is not intended to identify key features or essential features of the claimed subject matter, nor is it intended to be used to limit the scope of the claimed subject matter.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

In this description, references to "an embodiment," "one embodiment" or the like mean that the particular feature, function, structure or characteristic being described is included in at least one embodiment introduced here. Occurrences of such phrases in this specification do not necessarily all refer to the same embodiment. On the other hand, the embodiments referred to also are not necessarily mutually exclusive.

Some depth sensing devices such as HMD devices and other types of NED devices include depth cameras to detect depth information relating to objects in the environment in which the device is located. The depth sensing device can include an illumination module (e.g., an LED or a laser) that actively casts light into the environment of the device. With the illumination module, the depth sensing device is also called an active depth sensing device, and the depth camera is also called active depth camera. One type of active depth cameras is a ToF camera. Another type is a structured light camera. For example, the illumination module is designed to emit light that illuminates the environment. The environment reflects the light and an imaging sensor of the depth camera receives at least some of the reflected light for depth sensing. In some embodiments, the light emitted by the illumination module has a frequency range that is outside of the visible spectrum (i.e., visible to a normal human). For example, the emitted light can be, e.g., infrared (IR) light. A ToF system precisely measures the time or phase of the returned signal to determine the distance to an object (depth), whereas a structured light system measures the observed physical distortion of the image to determine the distance.

In some embodiments, the HMD device can track a body part of the user based on the detected depth information. For example, the HMD device can recognize and track a hand of the user. Furthermore, based on the location of the hand over a time period, the HMD device can recognize a hand gesture made by the user. The HMD device can further use the detected depth information to conduct a spatial mapping of the environment.

In general, depth detection can be used to detect a body part of the user, such as to track the user's hands for gesture recognition, or to map surfaces of nearby objects other than the user (e.g., walls, furniture, etc.), or for semantic labeling of nearby objects. In general, a wide (geometrically) field of illumination (FOI) and corresponding field of view (FOV) of the imager is desirable for short-range depth detection, such as for hand tracking. A wide FOV is also desirable for passive image-based head-tracking. In contrast, for longer range depth detection, such as for spatial mapping or semantic labeling, a narrower FOI and corresponding FOV can be used.

The HMD device can further include an imaging sensor for detect light of a frequency range that is within the visible spectrum (also referred to as visible light). The imaging sensor records images based on the visible light for at least a SLAM purpose (e.g., head-tracking). When a user who wears the HMD moves his or her head, the imaging sensor of the HMD records images of the environment at different positions and/or from different directions. The HMD device can analyze the images taken at different positions and/or from different directions and detect accordingly the position and/or orientation of the user's head.

The technique introduced here enables the use of concurrent imaging frames (e.g., IR and RGB (visible) at the same time) or sequential imaging frames (e.g., alternating IR and visible frames). To reduce power consumption and reduce the sizes of the HMD device's components, the HMD device according to the technique introduced here includes a multi-spectrum imaging sensor. The multi-spectrum imaging sensor can detect both light outside of the (human) visible spectrum (e.g., IR light) and light within the visible spectrum. In other words, the HMD device can use a single multi-spectrum imaging sensor as a low-cost solution for head tracking, hand tracking, and spatial mapping purposes, for example.

Furthermore, the HMD device can include separate illumination modules for emitting light of different FOIs and/or illumination ranges (e.g., wide FOI and narrow FOI, short range or long range). The light of different FOIs can be used for hand tracking and spatial mapping, respectively. For example, a long range ("long-throw") illumination module can emit structured light with a narrow FOI for spatial mapping. A separate short range ("short-throw") illumination module can emit light with a wide FOI (e.g., greater than 120 degrees), such as for hand tracking. The short-throw and long-throw illumination can be in the same frequency range, e.g., IR. A "wide" FOI, as the term is used herein, is wider than 120 degrees, whereas a "narrow" FOI is narrower than 120 degrees. The terms "short-throw" and "long-throw" are used herein relative to each other; that is, long-throw illumination has a longer effective range of illumination than short-throw illumination.

FIGS. 1 through 8 and associated text describe certain embodiments of a technology for the HMD device with a multi-spectrum sensor. However, the disclosed embodiments are not limited to NED systems or HMD devices and have a variety of possible applications, such as in computer monitor systems, head-up display (HUD) systems, self-driving automobile systems, information input systems, and video game systems. All such applications, improvements, or modifications are considered within the scope of the concepts disclosed here.

HMD Device Hardware

Figure 1:
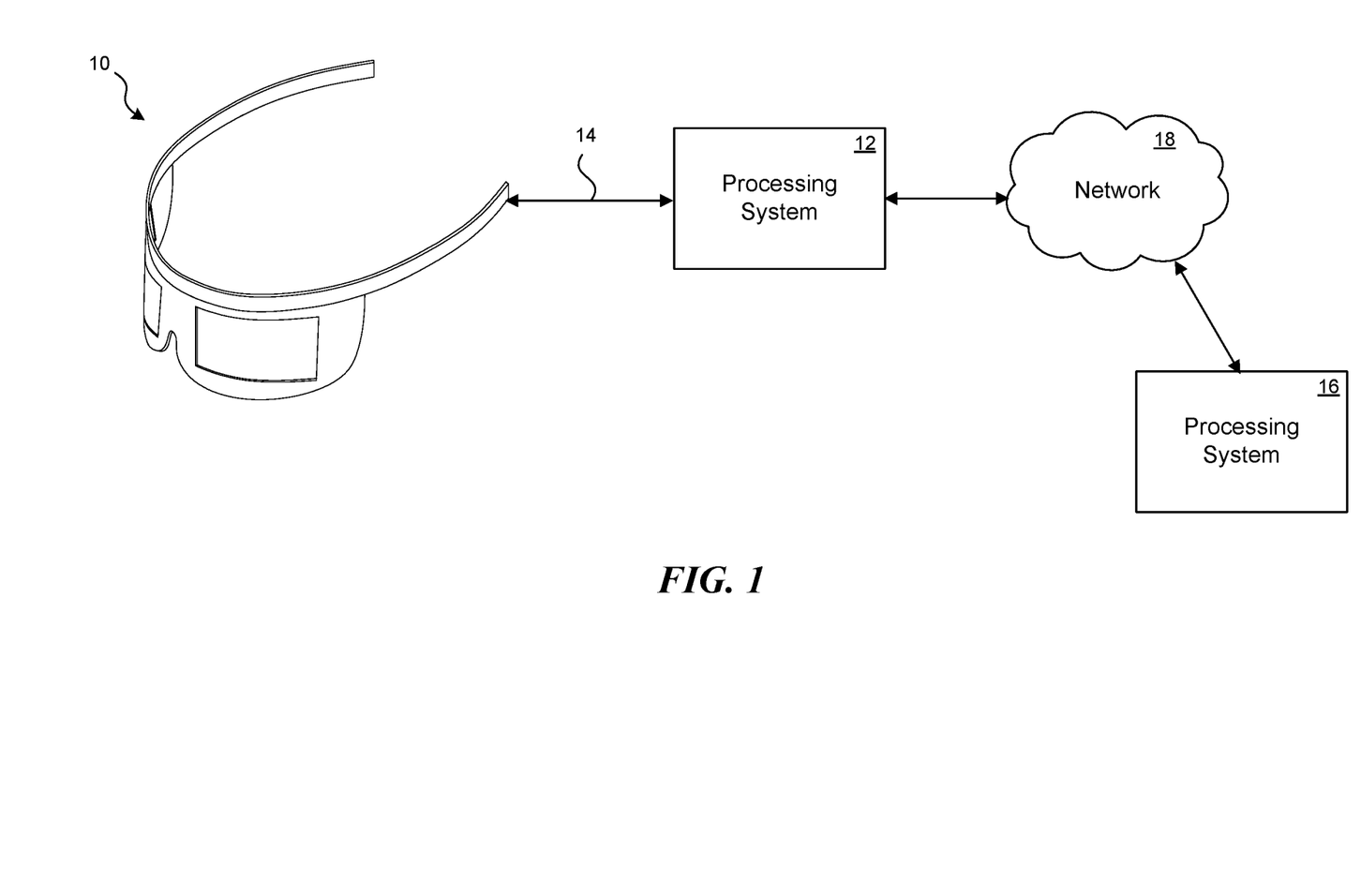
FIG. 1 shows an example of an environment in which a virtual reality (VR) or augmented reality (AR) enabled HMD device can be used.

FIG. 1 schematically shows an example of an environment in which an HMD device can be used. In the illustrated example, the HMD device 10 is configured to communicate data to and from an external processing system 12 through a connection 14, which can be a wired connection, a wireless connection, or a combination thereof. In other use cases, however, the HMD device 10 may operate as a standalone device. The connection 14 can be configured to carry any kind of data, such as image data (e.g., still images and/or full-motion video, including 2D and 3D images), audio, multimedia, voice, and/or any other type(s) of data. The processing system 12 may be, for example, a game console, personal computer, tablet computer, smartphone, or other type of processing device. The connection 14 can be, for example, a universal serial bus (USB) connection, Wi-Fi connection, Bluetooth or Bluetooth Low Energy (BLE) connection, Ethernet connection, cable connection, digital subscriber line (DSL) connection, cellular connection (e.g., 3G, LTE/4G or 5G), or the like, or a combination thereof. Additionally, the processing system 12 may communicate with one or more other processing systems 16 via a network 18, which may be or include, for example, a local area network (LAN), a wide area network (WAN), an intranet, a metropolitan area network (MAN), the global Internet, or combinations thereof.

Figure 2:
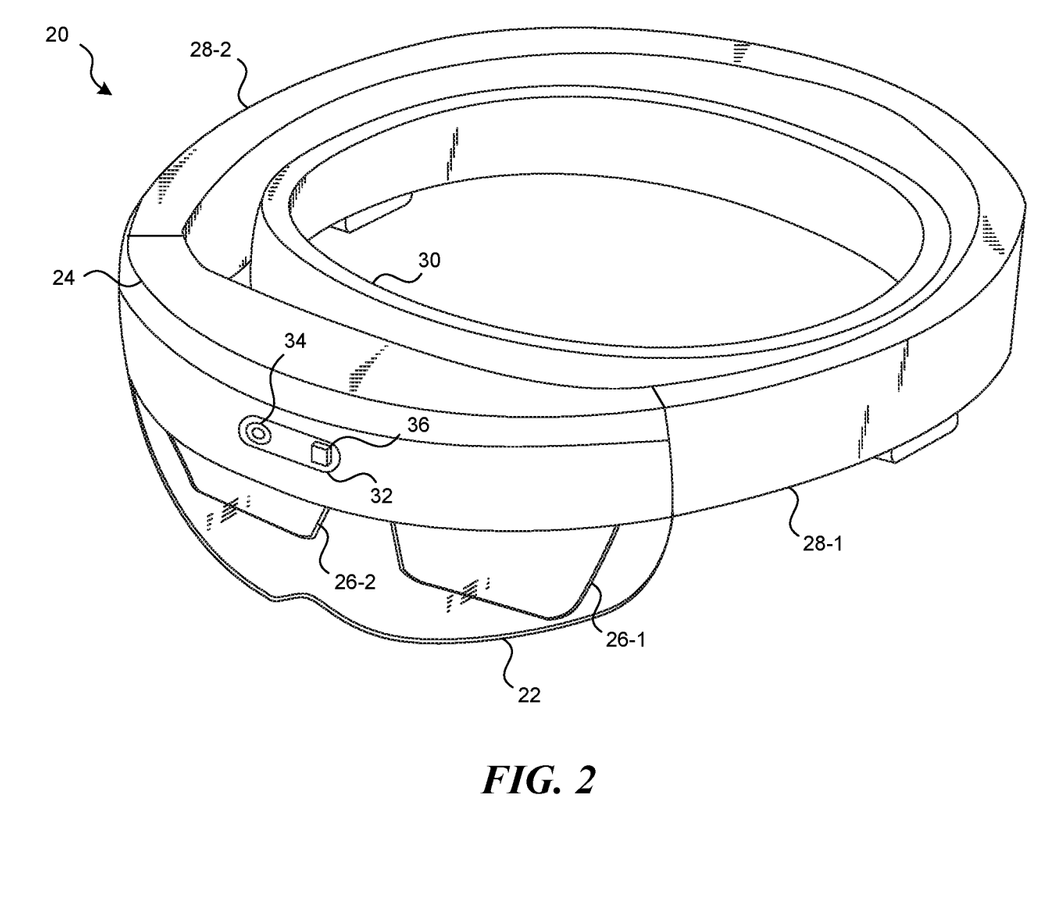
FIG. 2 illustrates a perspective view of an example of an HMD device.

FIG. 2 shows a perspective view of an HMD device 20 that can incorporate the features being introduced here, according to certain embodiments. The HMD device 20 can be an embodiment of the HMD device 10 of FIG. 1. The HMD device 20 has a protective sealed visor assembly 22 (hereafter the "visor assembly 22") that includes a chassis 24. The chassis 24 is the structural component by which display elements, optics, sensors and electronics are coupled to the rest of the HMD device 20. The chassis 24 can be formed of molded plastic, lightweight metal alloy, or polymer, for example.

The visor assembly 22 includes left and right AR displays 26-1 and 26-2, respectively. The AR displays 26-1 and 26-2 are configured to display images overlaid on the user's view of the real-world environment, for example, by projecting light into the user's eyes. Left and right side arms 28-1 and 28-2, respectively, are structures that attach to the chassis 24 at the left and right open ends of the chassis 24, respectively, via flexible or rigid fastening mechanisms (including one or more clamps, hinges, etc.). The HMD device 20 includes an adjustable headband (or other type of head fitting) 30, attached to the side arms 28-1 and 28-2, by which the HMD device 20 can be worn on the user's head.

The chassis 24 may include various fixtures (e.g., screw holes, raised flat surfaces, etc.) to which an illumination-and-sensor module 32 and other components can be attached. In some embodiments the illumination-and-sensor module 32 is contained within the visor assembly 22 and mounted to an interior surface of the chassis 24 via a lightweight metal frame (not shown). A circuit board (not shown in FIG. 2) bearing electronics components of the HMD 20 (e.g., microprocessor, memory) can also be mounted to the chassis 24 within the visor assembly 22.

The illumination-and-sensor module 32 includes a depth camera 34 and an illumination module 36 of a depth imaging system. The illumination module 36 emits light to illuminate a scene. Some of the light reflects off surfaces of objects in the scene, and returns back to the imaging camera 34. In some embodiments, the illumination modules 36 and the depth cameras 34 can be separate units that are connected by a flexible printed circuit or other data communication interfaces. The depth camera 34 captures the reflected light that includes at least a portion of the light from the illumination module 36.

The "light" emitted from the illumination module 36 is electromagnetic radiation suitable for depth sensing and should not directly interfere with the user's view of the real world. As such, the light emitted from the illumination module 36 is typically not part of the human-visible spectrum. Examples of the emitted light include IR light to make the illumination unobtrusive. Sources of the light emitted by the illumination module 36 may include LEDs such as super-luminescent LEDs, laser diodes, or any other semiconductor-based light source with sufficient power output. As described above and as further described below, the illumination module 36 may emit IR light in both wide FOI and narrow FOI; or, the HMD device 20 may have two or more illumination modules 36 for that purpose.

The depth camera 34 may be or include any imaging sensor configured to capture light emitted by one or more illumination modules 36. The depth camera 34 may include a lens that gathers reflected light and images the environment onto the imaging sensor. An optical bandpass filter may be used to pass only the light with the same wavelength as the light emitted by the illumination module 36. For example, in a structured light depth imaging system, each pixel of the depth camera 34 may use triangulation to determine the distance to objects in the scene. Any of various approaches known to persons skilled in the art can be used for making the corresponding depth calculations.

The HMD device 20 includes electronics circuitry (not shown in FIG. 2) to control the operations of the depth camera 34 and the illumination module 36, visible light capture & processing, and to perform associated data processing functions. The circuitry may include, for example, one or more processors and one or more memories. As a result, the HMD device 20 can provide surface reconstruction to model the user's environment, or can be used as a sensor to receive human interaction information. With such a configuration, images generated by the HMD device 20 can be properly overlaid on the user's 3D view of the real world to provide a so-called augmented reality. Note that in other embodiments the aforementioned components may be located in different locations on the HMD device 20. Additionally, some embodiments may omit some of the aforementioned components and/or may include additional components not discussed above nor shown in FIG. 2. In some alternative embodiments, the aforementioned depth imaging system can be included in devices that are not HMD devices. For example, depth imaging systems can be used in motion sensing input devices for computers or game consoles, automotive sensing devices, earth topography detectors, robots, etc.

Figure 3:
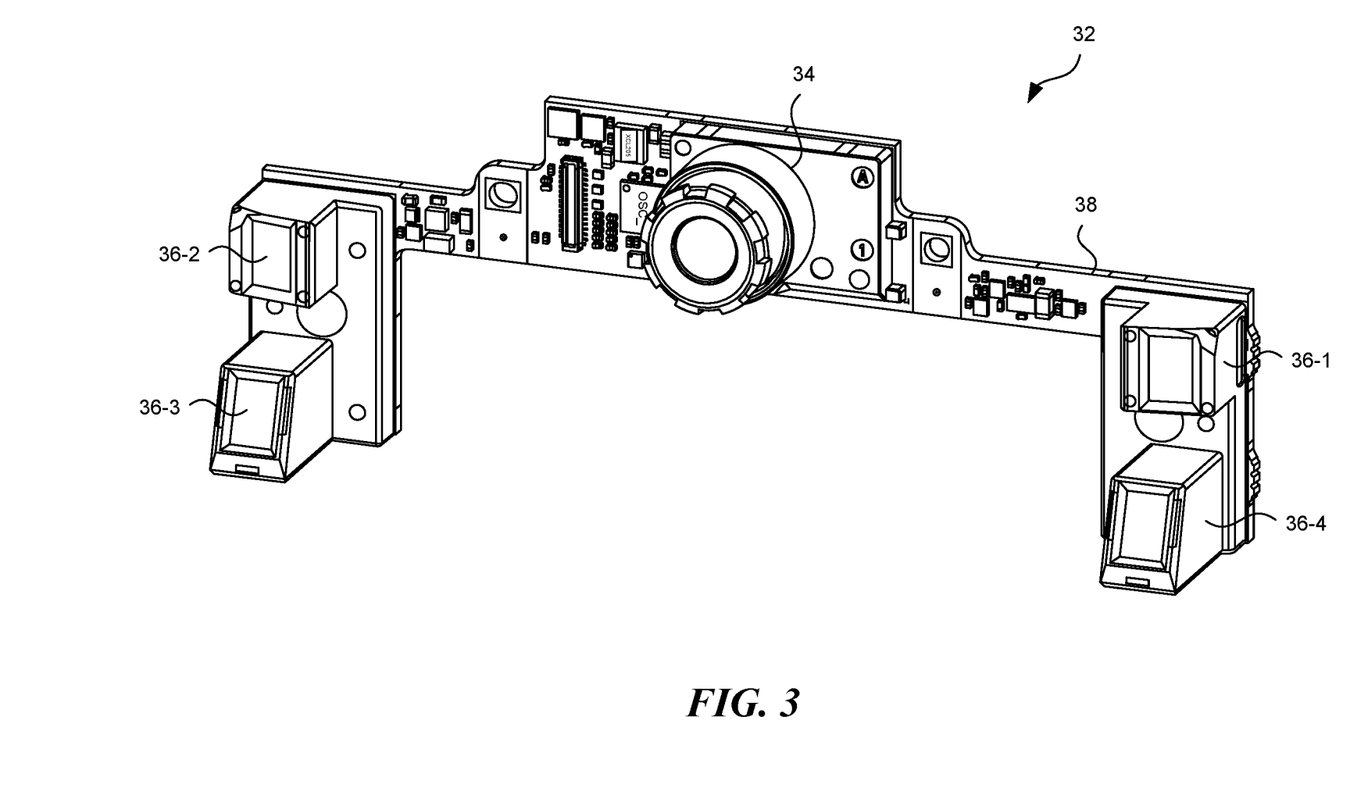
FIG. 3 shows a front view of a portion of an illumination-and-sensor module of an HMD device.

FIG. 3 shows an example embodiment of the illumination-and-sensor module 32 of the HMD device 20. As shown, the illumination-and-sensor module 32 includes sensors and electronics mounted to a circuit board 38, which can be mounted to the chassis 24 as mentioned above. The sensors mounted to the circuit board 38 include the depth camera 34 and the illumination modules 36-1 through 36-4. Other sensors that may be included in the illumination-and-sensor module 32 but are not shown in the figures or discussed further may include one or more visible-spectrum head-tracking cameras, ambient light sensors, and the like. Some or all of these other sensors may also be mounted to the illumination-and-sensor module 32.

In the illustrated embodiment, illumination modules 36-1 and 36-2 are positioned such that they emit light in slightly outwardly divergent directions with respect to the depth camera 34; whereas illumination modules 36-3 and 36-4 are positioned such that they emit light directly forward (i.e., parallel to the user's head-pointing vector). Moreover, illumination from illumination modules 36-3 and 36-4 has a reduced FOI and increased range from the depth camera 34 that is greater than the range of illumination from illumination modules 36-1 and 36-2 from the depth camera 34. In some embodiments, the illumination modules 36-1 and 36-2 provide illumination for hand tracking purpose and the illumination modules 36-3 and 36-4 provide illumination for spatial mapping purpose.

Hence, illumination modules 36-1 through 36-4 are collectively configured to illuminate at least a portion of the user's environment, although the illumination may not be visible to the user. The locations and positions of the illumination modules 36 and the depth camera 34 relative to each other as shown in FIG. 3 are merely examples of a configuration used for depth sensing; other configurations are possible in the context of the technique introduced here.

Multi-Spectrum Imaging Sensor

Figure 4:
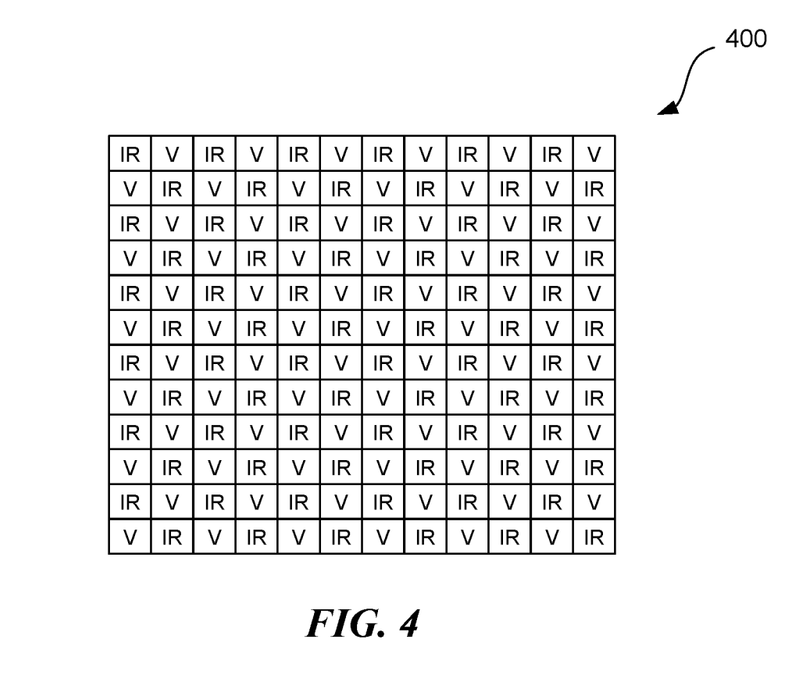
FIG. 4 schematically illustrates a multi-spectrum imaging sensor for detecting visible light and infrared (IR) light.

FIG. 4 schematically illustrates a multi-spectrum sensor for detecting both visible light and IR light. The multi-spectrum sensor 400 includes two different types of sensor pixels: visible light pixels and IR light pixels. The visible light pixels (each denoted by a "V" in FIG. 4) are sensitive to broadband visible light (e.g., from 400 nm to 650 nm) and have limited sensitive to IR light. The IR light pixels (each denoted by an "IR" in FIG. 4) are sensitive to IR light and have limited sensitivity to optical crosstalk from the visible light. In the illustrated embodiment the IR pixels and the visible light pixels are interspersed on the sensor 400 in a checkerboard-like (i.e., two-dimensionally alternating) fashion. The multi-spectrum 400 sensor can be coupled to an IR bandpass filter (not shown in FIG. 4) to minimize the amount of ambient IR light that is incident on the IR light pixels. In some embodiments the bandpass filter passes visible light with wavelengths in the range of 400-650 nm and IR narrowband (e.g., wavelength span less than 30 nm).

In some embodiments, the visible light pixels of the multi-spectrum sensor 400 collectively serve as a passive imaging sensor to collect visible light and record grayscale visible light images. The HMD device can use the visible light images for a SLAM purpose, such as head tracking. The IR light pixels of the multi-spectrum sensor 400 collectively serve as a depth camera sensor to collect IR light and record IR images (also referred to as monochrome IR images) for depth sensing, such as for hand tracking, spatial mapping and/or semantic labeling of objects.

Long-Throw and Short-Throw Illumination

In some embodiments, an HMD device (e.g., such as the one shown in FIG. 2) includes separate illumination modules for short-throw IR illumination and long-throw IR illumination. The short-throw IR illumination is used mainly for hand tracking and gesture recognition, and the long-throw IR illumination is used mainly for spatial mapping of the environment (i.e., mapping of objects in the user's environment) and/or semantic labeling of objects. The short-throw IR illumination module has a relatively wide FOI for phase-based hand tracking. The long-throw IR illumination module emits light with a narrow FOI (e.g., 75 degrees) for phase-based spatial mapping and/or semantic labeling. In some embodiments, a single multi-spectrum sensor, such as that shown in FIG. 4, is used to detect both the short-throw and long-throw IR illumination, as well as visible light. Visible light detection can be used for SLAM, such as head-tracking, i.e., tracking the position and/or orientation of the head of the user of the HMD device.

In some embodiments, the short-throw IR illumination and long-throw IR illumination have the same frequencies or frequency ranges, and to enable differentiation between the returned (reflected) light signals of short-throw and long-throw IR illumination, they can occur at different, non-overlapping points in time, i.e., by time-division multiplexing.

In some embodiments the long-throw IR illumination module emits light in a structured light illumination pattern to enable depth detection. In other embodiments the long throw IR illumination module emits ToF modulated light pulses for depth detection. In still other embodiments the long-throw illuminator emits a structured light illumination pattern and applies a time-modulated signal to the structured illumination pattern so as to enable depth detection based on a combination of ToF and structured light. The structured light pattern can facilitate long-range depth accuracy based on the ToF modulated signals. The structured light illumination has a narrower FOI, stronger illumination power, and a corresponding longer range than the short-throw illumination.

Figure 5:
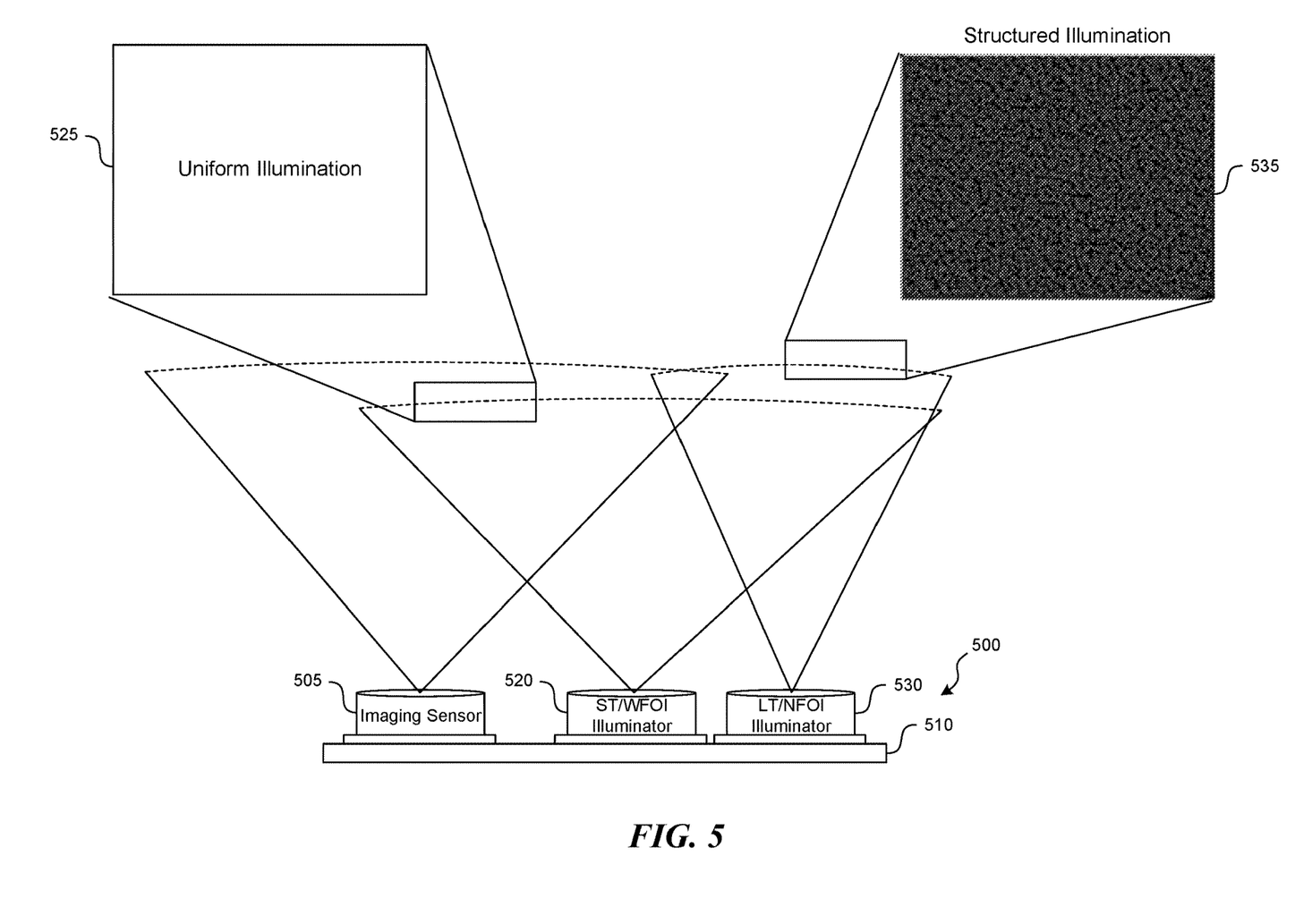
FIG. 5 schematically illustrates a device including separate illumination modules for short-throw and long-throw.

FIG. 5 schematically illustrates a multi-spectrum illumination-and-sensor module 500 including separate illumination modules for short-throw and long-throw illumination and detection. The multi-spectrum illumination-and sensor module 500 can be included in, for example, an HMD device (e.g., HMD device 20 in FIG. 2 or a similar device) and can include a multi-spectrum imaging sensor 505, a short-throw ("ST") illumination module 520, and a long-throw ("LT") illumination module 530, all mounted on a circuit board 510. The multi-spectrum imaging sensor 505 can be the same as or similar to the multi-spectrum sensor 400 illustrated in FIG. 4, and can detect light signals of both visible light (e.g., for head tracking) and IR light (for depth sensing). The entire multi-spectrum illumination-and sensor module 500 can have a physical configuration and/or footprint similar to that of illumination-and-sensor module 32 in FIG. 3.

The short-throw illumination module 520 has a relatively wide FOI ("WFOI") to cover the most likely locations of the user's hands. Since hand tracking operation concerns depths that are close to the HMD device, the short-throw illumination module 520 provides a wide FOI with reduced optical power over a relatively short illumination range. In some embodiments, the short-throw illumination module 520 provides a uniform illumination pattern 525. The short-throw illumination module 520 can produce a uniform illumination pattern, for example, by using a multi-mode diode laser coupled with an optical diffuser.

The long-throw illumination module 530 has a narrower FOI ("NFOI") (and a longer effective range) than the short-throw illumination module 520 and is used for spatial mapping of the immediate environment of the user and/or for semantic labeling of nearby objects. Since the long-throw illumination module 530 provides illumination to the user's environment, it has a relatively long illumination range and, in some embodiments, produces a structured light illumination pattern 535 to facilitate recognition of surfaces. In some embodiments, the long-throw illumination module 530 includes a diffraction limited light source, a collimating lens and a diffractive optical element.

Dot-Based Pattern for Reducing Multipath Interference

Figure 6A:
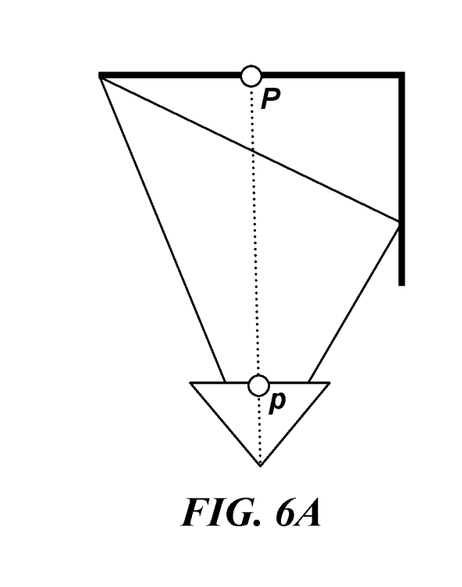
FIG. 6A schematically illustrates a situation without multipath interference.
Figure 6B:
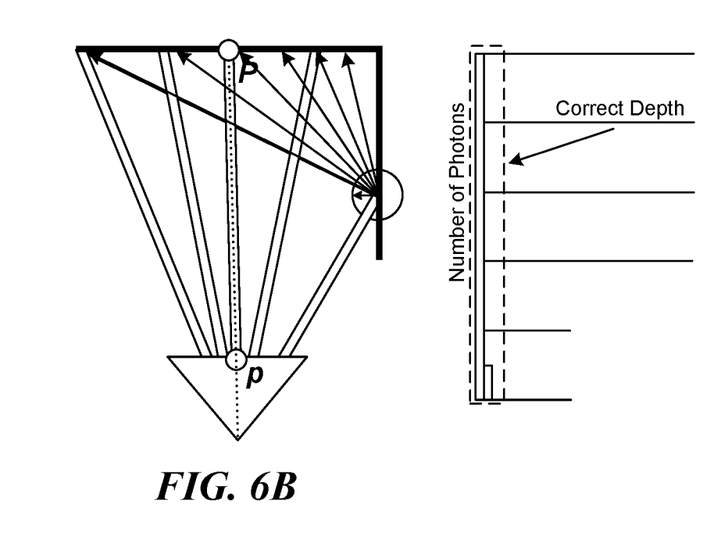
FIG. 6B schematically illustrates a situation with multipath interference.

In some embodiments, the structured light illumination pattern 535 is a dot-based illumination pattern that can reduce multipath interference. FIGS. 6A and 6B schematically illustrate how a dot-based structured illumination pattern reduces multipath interference. As shown in FIG. 6A, in an ideal scenario there is minimal multipath interference, since the effects of multipath are spread over the entire scene, and the signal thresholding can be used to measure only a response on the illumination dots. A point P in the environment is illuminated by light emitted by the illumination module and reflects back the light to the imaging sensor. The emitted light and the reflected light travel in a single light path. The device detects the time taken for the light to travel from the illumination module and to reflect back from the point in the single light path. The time is converted into a depth measurement. A single depth measurement is detected as a result of the single light path.

FIG. 6B shows a scenario that has multipath interference. The illumination module emits light uniformly over the FOI. One or more environmental objects can reflect the light in multiple directions, as shown. Consequently, a point P in the environment can receive light beams that travel along multiple different light paths, whose lengths are not equal. Consequently, for each point P in the environment, the depth sensing device may undesirably detect multiple depth measurements resulting in an incorrect depth estimation.

To reduce the effect of multipath interference, therefore, the illumination module can use a dot-based structured light illumination pattern that includes multiple discrete dots or other shapes. The discrete dots significantly reduce the likelihood that multiple light beams propagating along different paths will reach any particular point in the user's environment. As a result, the device will tend to detect fewer depth measurements and, hence, will have reduced multipath interference. There is also the added benefit of conditioning the illumination power into individual light bundles, e.g., illumination dots, that have a higher optical intensity than the flood illumination pattern.

Figure 7A:
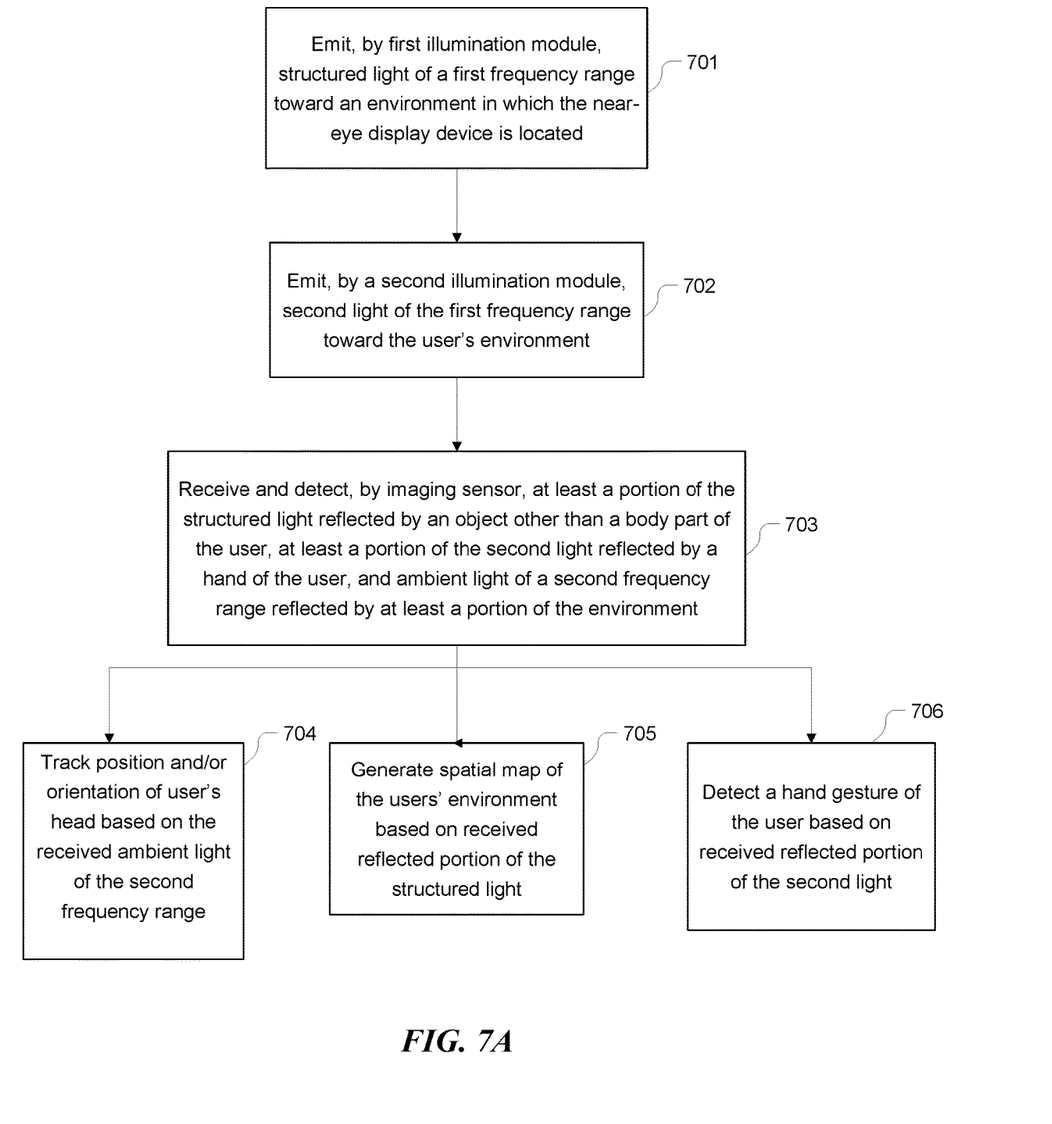
FIG. 7A illustrates a first example of a process by which a multi-spectrum imaging sensor and multiple illumination modules can be cooperatively employed in an HMD device.

FIG. 7A illustrates an example of a process by which a multi-spectrum imaging sensor and multiple illumination modules can be cooperatively employed in an NED device, such as an HMD device. Initially, at step 701 a first illumination module of the NED device emits structured light of a first frequency range toward an environment in which the NED device is located. The environment includes at least one object in addition to the user of the NED device. At step 702 a second illumination module of the NED device emits second light of the first frequency range towards the environment. At step 703, an imaging sensor of the near-eye display device (e.g., one the same as or similar to multi-spectrum imaging sensor 400 in FIG. 4) receives and detects: 1) at least a portion of the emitted structured light after reflection by the object, 2) at least a portion of the emitted second light after reflection by a hand of the user, and 3) ambient light of a second frequency range reflected by at least a portion of the environment. The NED device then at step 704 tracks a position and/or orientation of the user's head based on the received ambient light of the second frequency range, at step 705 generates a spatial map of the user's environment based on the received portion of the structured light, and at step 706 detects a hand gesture by the user based on the received reflected portion of the second light. At least steps 704, 705 and 706 may occur concurrently. Note also that the order of certain steps can be changed consistent with this disclosure. This process may continue to repeat indefinitely as long as the device is operational or in a particular mode of operation.

Figure 7B:
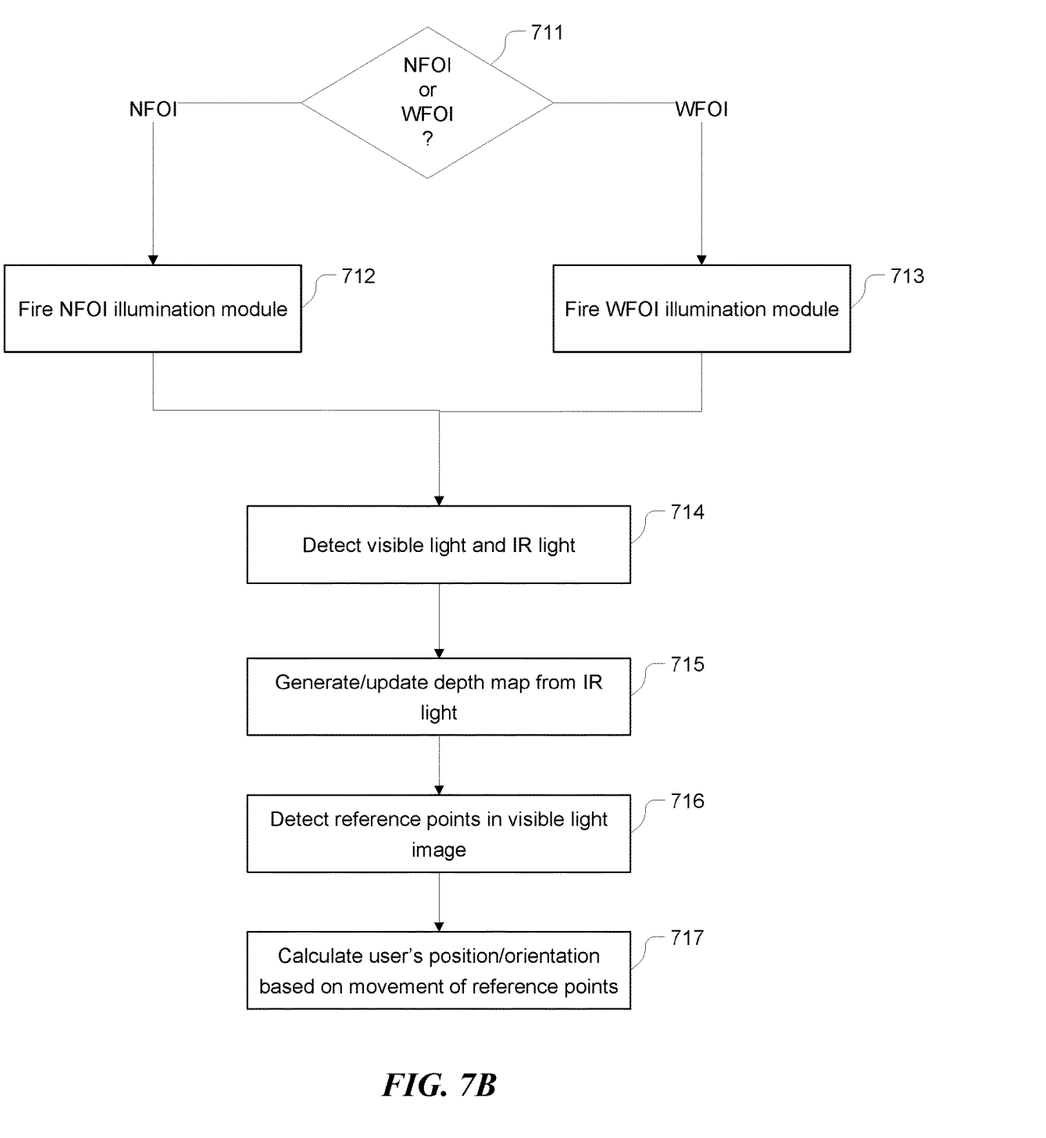
FIG. 7B illustrates a second example of a process by which a multi-spectrum imaging sensor and multiple illumination modules can be cooperatively employed in an HMD device.

FIG. 7B illustrates another example of a process by which a multi-spectrum imaging sensor and multiple illumination modules can be cooperatively employed in an NED device, such as an HMD device. Note that the processes of FIGS. 7A and 7B are not necessarily mutually exclusive. As such, the order of certain steps can be changed consistent with this disclosure. At step 711, a processor in the device determines whether a narrow FOI ("NFOI") or wide FOI ("WFOI") IR frame is needed. NFOI and WFOI IR frames may be captured on an alternating basis, in which case the outcome of this step depends on which type of IR frame (NFOI or WFOI) was captured most recently. If a NFOI frame is needed, the processor causes the NFOI IR illuminator (e.g., illuminator 530 in FIG. 5) to fire at step 712; otherwise if a WFOI frame is needed the processor causes the WFOI IR illuminator (e.g., illuminator 520 in FIG. 5) to fire at step 713. Next, at step 714 a multi-spectrum imaging sensor in the device (such as sensor 400 in FIG. 4 or sensor 505 in FIG. 5) detects reflections of the emitted IR light that was emitted step 712 or 713 and at the same time detects reflections of ambient visible light from objects in the environment. At step 715 the processor generates or updates a corresponding depth map based on the captured IR light frame (e.g., a depth map for hand tracking and/or a depth map for spatial mapping). At step 716 the processor detects reference points in the captured visible light image frame, and at step 717 the processor calculates a position/orientation of the user based on movement of one or more of the reference points. This process may continue to repeat indefinitely as long as the device is operational or in a particular mode of operation.

Sample Hardware Architecture

Figure 8:
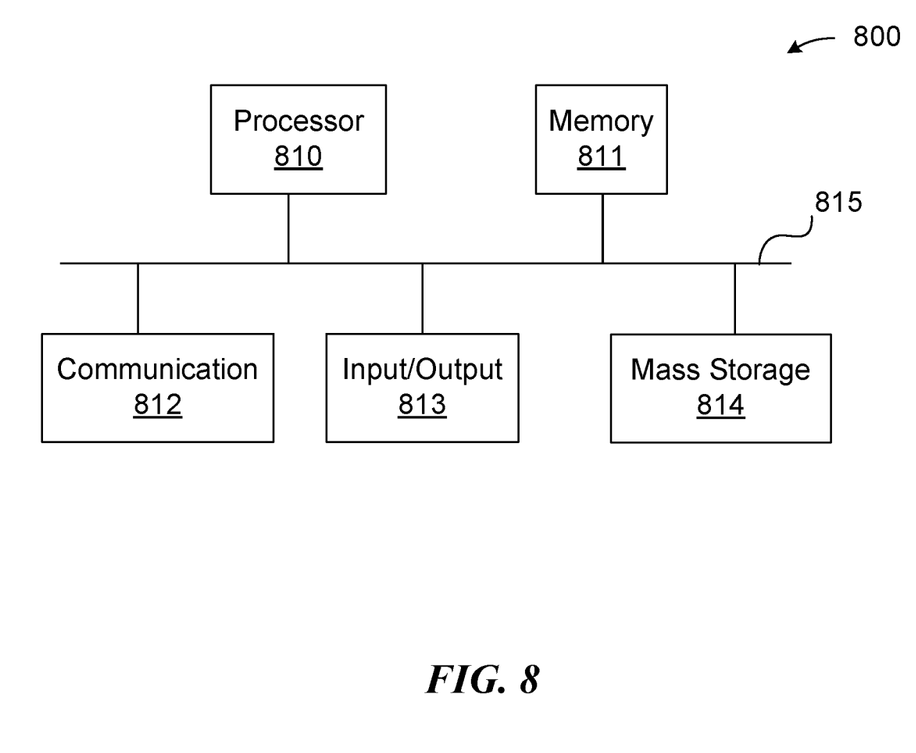
FIG. 8 shows a high-level example of a hardware architecture of a system that can be used to implement any one or more of the functional components described herein.

FIG. 8 shows a high-level example of a hardware architecture of a processing system that can be used to implement the disclosed functions. The processing system 800 illustrated in FIG. 8 can be, e.g., a subsystem of an HMD device or other system that employs one or more depth sensing devices. One or multiple instances of an architecture such as shown in FIG. 8 (e.g., multiple computers) can be used to implement the techniques described herein, where multiple such instances can be coupled to each other via one or more networks.

The illustrated processing system 800 includes one or more processors 810, one or more memories 811, one or more communication device(s) 812, one or more input/output (I/O) devices 813, and one or more mass storage devices 814, all coupled to each other through an interconnect 815. The interconnect 815 may be or include one or more conductive traces, buses, point-to-point connections, controllers, adapters and/or other conventional connection devices. Each processor 810 controls, at least in part, the overall operation of the processing device 800 and can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Each memory 811 can be or include one or more physical storage devices, which may be in the form of random access memory (RAM), read-only memory (ROM) (which may be erasable and programmable), flash memory, miniature hard disk drive, or other suitable type of storage device, or a combination of such devices. Each mass storage device 814 can be or include one or more hard drives, digital versatile disks (DVDs), flash memories, or the like. Each memory 811 and/or mass storage 814 can store (individually or collectively) data and instructions that configure the processor(s) 810 to execute operations to implement the techniques described above. Each communication device 812 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing system 800, each I/O device 813 can be or include a device such as a display (which may be a touch screen display), audio speaker, keyboard, mouse or other pointing device, microphone, camera, etc. Note, however, that such I/O devices may be unnecessary if the processing device 800 is embodied solely as a server computer.

In the case of a user device, a communication device 812 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, a communication device 812 can be or include, for example, any of the aforementioned types of communication devices, a wired Ethernet adapter, cable modem, DSL modem, or the like, or a combination of such devices.

The machine-implemented operations described above can be implemented at least partially by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the embodiments introduced here may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Examples of Certain Embodiments

Certain embodiments of the technology introduced herein are summarized in the following numbered examples:

1. A near-eye display device comprising: an illumination module that, when in operation, emits first light of a first frequency range toward an environment of the near-eye display device; an imaging sensor that, when in operation, receives the first light of the first frequency range reflected by the environment and second light of a second frequency range reflected by the environment; and a processor that, when in operation, determines a depth map based on the received first light and that tracks a position and/or orientation of at least a part of the user based on the received second light.

2. The near-eye display device of example 1, wherein the imaging sensor includes a first plurality of pixels configured to receive light of the first frequency range and a second plurality of pixels configured to receive light of the second frequency range, and wherein the second plurality of pixels are interspersed with the first plurality of pixels.

3. The near-eye display device of example 1 or example 2, further comprising an optical bandpass filter that reduces ambient light of the first frequency range incident on the first plurality of pixels.

4. The near-eye display device of any of examples 1 through 3, wherein the first frequency range is within an infrared range and the second frequency range is within a visible range.

5. The near-eye display device of any of examples 1 through 4, wherein the illumination module is a first illumination module, the near-eye display device further comprising a second illumination module that, when in operation, emits third light of the first frequency range toward the environment of the near-eye display device; wherein the imaging sensor is further configured to receive at least a portion of the third light of the first frequency range.

6. The near-eye display device of any of examples 1 through 5, wherein the processor is further configured to generate or update a depth map based on the received portion of the third light of the first frequency range.

7. The near-eye display device of any of examples 1 through 6, wherein the first illumination module has an effective illumination range that is greater than an effective illumination range of the second illumination module.

8. The near-eye display device of any of examples 1 through 7, wherein the first illumination module has a field of illumination that is narrower than a field of illumination of the second illumination module.

9. The near-eye display device of any of examples 1 through 8, wherein the first illumination module and the second illumination module emit light at different points in time, and the imaging sensor receives the first light of the first frequency range and the second light of the first frequency range at different points in time.

10. The near-eye display device of any of examples 1 through 9, wherein the second illumination module emits at least one of the first light or the third light with a structured illumination pattern.

11. A near-eye display device comprising: a first illumination module that, when in operation, emits structured infrared light toward an environment in which the near-eye display device is located, the environment including an object other than a user of the near-eye display device; a second illumination module that, when in operation, emits second infrared light toward the environment in which the near-eye display device is located; an imaging sensor that, when in operation, receives a portion of the structured infrared light reflected by the object, a portion of the second infrared light reflected by a body part of the user of the near-eye display device, and ambient visible light reflected by at least a portion of the environment; and a processor that, when in operation, determines a first set of depth values based on the received portion of the structured infrared light, determines a second set of depth values based on the received portion of the second infrared light, and performs a Simultaneous Localization and Mapping (SLAM) function based on the received portion of the visible light.

12. The near-eye display device of example 11, wherein the imaging sensor converts the received portion of the first infrared light and the received portion of the second infrared light into depth information based on time of flight and phase shifts from the first and second illumination modules to the imaging sensor.

13. The near-eye display device of example 11 or example 12, wherein the first infrared light has a structured illumination pattern.

14. The near-eye display device of any of examples 11 through 13, wherein the processor applies a time-of-flight calculation to the received portion of the structured light.

15. The near-eye display device of any of examples 11 through 14, wherein the processor, when in operation, uses the received portion of the first infrared light to determine depth values for spatial mapping and/or semantic labeling, uses the received portion of the second infrared light to determine depth values for hand tracking, and uses the received portion of the visible light to perform head tracking.

16. The near-eye display device of any of examples 11 through 15, wherein the first illumination module has an effective illumination range that is greater than an illumination range of the second illumination module.

17. The near-eye display device of any of examples 11 through 16, wherein the first illumination module has a field of illumination that is narrower than a field of illumination of the second illumination module.

18. The near-eye display device of any of examples 11 through 17, wherein the first illumination module and the second illumination module emit light at different times, and the imaging sensor receives the first infrared light and the second infrared light range at different times.

19. A method comprising: emitting, by a first illumination module, structured light of a first frequency range toward an environment in which the near-eye display device is located, the environment including an object other than a user of the near-eye display device; emitting, by a second illumination module, second light of the first frequency range toward the environment; receiving, by an imaging sensor of the near-eye display device, at least a portion of the structured light reflected by the object, at least a portion of the second light reflected by a body part of the user of the near-eye display device, and ambient light of a second frequency range reflected by at least a portion of the environment; tracking a position and/or orientation of the head of the user based on the received ambient light of the second frequency range; and generating a depth map of the environment based on the received portion of the structured light and detecting a gesture made by the body part of the user based on the received at least a portion of the second light.

20. The method of example 18, wherein: the structured light has an illumination range that is greater than an illumination range of the second light; and the structured light has a field of illumination that is narrower than a field of illumination of the second light.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A near-eye display device comprising:
an illumination module that, when in operation, emits first light of a first frequency range toward an environment of the near-eye display device;
a second illumination module that, when in operation, emits second light of the first frequency range toward the environment of the near-eye display device;
a single camera that, when in operation, receives the first light of the first frequency range reflected by the environment, the second light of the first frequency range reflected by the environment, and a third light of a second frequency range; and
a processor that, when in operation, determines a depth map based on the received first light, tracks a hand for gesture recognition based on the received second light, and tracks a position and/or orientation of at least a part of a user based on the received third light.

2. The near-eye display device of claim 1, wherein the single camera includes a first plurality of pixels configured to receive light of the first frequency range and a second plurality of pixels configured to receive light of the second frequency range, and wherein the second plurality of pixels are interspersed with the first plurality of pixels.

3. The near-eye display device of claim 2, further comprising:
an optical bandpass filter that reduces ambient light of the first frequency range incident on the first plurality of pixels.

4. The near-eye display device of claim 1, wherein the first frequency range is within an infrared range and the second frequency range is within a visible range.

5. The near-eye display device of claim 1, wherein the third light of the second frequency range comprises ambient visible light.

6. The near-eye display device of claim 5, wherein the illumination module has an effective illumination range that is greater than an effective illumination range of the second illumination module.

7. The near-eye display device of claim 5, wherein the illumination module has a field of illumination that is narrower than a field of illumination of the second illumination module.

8. The near-eye display device of claim 5, wherein the illumination module and the second illumination module emit light at different points in time, and the imaging sensor receives the first light of the first frequency range and the second light of the first frequency range at different points in time.

9. The near-eye display device of claim 5, wherein the illumination module emits at least the first light with a structured illumination pattern.

10. The near-eye display device of claim 1, wherein the single camera is configured to concurrently receive the first light of the first frequency range reflected by the environment and the second light of the first frequency range reflected by the environment.

11. A near-eye display device comprising:
a first illumination module that, when in operation, emits structured infrared light toward an environment in which the near-eye display device is located, the environment including an object other than a user of the near-eye display device;
a second illumination module that, when in operation, emits second infrared light toward the environment in which the near-eye display device is located;
a single camera that, when in operation, receives a portion of the structured infrared light reflected by the object, a portion of the second infrared light reflected by a body part of the user of the near-eye display device, and ambient visible light reflected by at least a portion of the environment; and
a processor that, when in operation, determines a first set of depth values based on the received portion of the structured infrared light, determines a second set of depth values based on the received portion of the second infrared light, and performs a Simultaneous Localization and Mapping (SLAM) function based on the received portion of the ambient visible light.

12. The near-eye display device of claim 11, wherein the single camera converts the received portion of the structured infrared light and the received portion of the second infrared light into depth information based on time of flight and phase shifts from the first and second illumination modules to the single camera.

13. The near-eye display device of claim 11, wherein the structured infrared light has a structured illumination pattern.

14. The near-eye display device of claim 11, wherein the processor applies a time-of-flight calculation to the received portion of the structured infrared light.

15. The near-eye display device of claim 11, wherein the processor, when in operation, uses the received portion of the structured infrared light to determine depth values for spatial mapping and/or semantic labeling, uses the received portion of the second infrared light to determine depth values for hand tracking, and uses the received portion of the visible light to perform head tracking.

16. The near-eye display device of claim 11, wherein the first illumination module has an effective illumination range that is greater than an illumination range of the second illumination module.

17. The near-eye display device of claim 16, wherein the first illumination module has a field of illumination that is narrower than a field of illumination of the second illumination module.

18. The near-eye display device of claim 11, wherein the first illumination module and the second illumination module emit light at different times, and the single camera receives the structured infrared light and the second infrared light range at different times.

19. A method comprising:
emitting, by a first illumination module, structured light of a first frequency range toward an environment in which a near-eye display device is located, the environment including an object other than a user of the near-eye display device;
emitting, by a second illumination module, second light of the first frequency range toward the environment;
receiving, by a single camera of the near-eye display device, at least a portion of the structured light reflected by the object, at least a portion of the second light reflected by a body part of the user of the near-eye display device, and ambient visible light in at least a portion of the environment; and
generating a depth map of the environment based on the received portion of the structured light, detecting a gesture made by the body part of the user based on the received at least a portion of the second light, and tracking a position and/or orientation of a head of the user based on the received ambient light of the second frequency range.

20. A near-eye display device comprising:
an illumination module that, when in operation, emits first light of a first frequency range and a first field of illumination toward an environment of the near-eye display device;
a second illumination module that, when in operation, emits second light of the first frequency range and a second field of illumination toward the environment of the near-eye display device, wherein the first field of illumination is different than the second field of illumination;
a single camera that, when in operation, receives the first light of the first frequency range reflected by the environment, the second light of the first frequency range reflected by the environment, and a third light of a second frequency range; and
a processor that, when in operation, determines a depth map based on the received first light and tracks a position and/or orientation of at least a part of a user based on the received third light.

21. The near-eye display device of claim 20, wherein the third light of the second frequency range comprises ambient visible light.

22. The near-eye display device of claim 20, wherein the first frequency range is within an infrared range and the second frequency range is within a visible range.

23. The near-eye display device of claim 20, wherein the processor is further configured to track a position and/or orientation of at least a part of the user based on the received portion of the third light of the second frequency range.

24. The near-eye display device of claim 20, wherein the single camera is configured to concurrently receive the first light of the first frequency range reflected by the environment and the second light of the first frequency range reflected by the environment.

25. A near-eye display device comprising:
a first illumination module that, when in operation, emits structured infrared light at a first field of illumination toward an environment in which the near-eye display device is located, the environment including an object other than a user of the near-eye display device;
a second illumination module that, when in operation, emits second infrared light at a second field of illumination toward the environment in which the near-eye display device is located, wherein the first field of illumination is different than the second field of illumination;
a single camera that, when in operation, receives a portion of the structured infrared light reflected by the object, a portion of the second infrared light reflected by a body part of the user of the near-eye display device, and ambient visible light reflected by at least a portion of the environment; and
a processor that, when in operation, determines a first set of depth values based on the received portion of the structured infrared light, determines a second set of depth values based on the received portion of the second infrared light, and performs a Simultaneous Localization and Mapping (SLAM) function based on the received portion of the ambient visible light.

26. The near-eye display device of claim 25, wherein the processor, when in operation, uses the received portion of the first infrared light to determine depth values for spatial mapping and/or semantic labeling, uses the received portion of the second infrared light to determine depth values for hand tracking, and uses the received portion of the visible light to perform head tracking.

27. A method comprising:
emitting, by a first illumination module, structured light of a first frequency range and a first field of illumination toward an environment in which a near-eye display device is located, the environment including an object other than a user of the near-eye display device;
emitting, by a second illumination module, second light of the first frequency range and a second field of illumination toward the environment, wherein the first field of illumination is different than the second field of illumination;
receiving, by a single camera of the near-eye display device, at least a portion of the structured light reflected by the object, at least a portion of the second light reflected by a body part of the user of the near-eye display device, and third light of a second frequency range reflected by at least a portion of the environment; and
generating a depth map of the environment based on the received portion of the structured light, detecting a gesture made by the body part of the user based on the received at least a portion of the second light, and tracking a position and/or orientation of at least a part of a user based on the third light of the second frequency range.

28. The method of claim 27, wherein the third light of the second frequency range is ambient visible light.

* * * * *